March 16, 1948.  T. H. WINKELJOHN  2,437,900

LIQUID SEAL

Filed Dec. 10, 1943

INVENTOR.
Thomas H. Winkeljohn
BY
Evans + Meloy
ATTORNEYS

Patented Mar. 16, 1948

2,437,900

UNITED STATES PATENT OFFICE 2,437,900

LIQUID SEAL

Thomas H. Winkeljohn, Wabash, Ind., assignor to The General Tire & Rubber Company, Akron, Ohio, a corporation of Ohio Application December 10, 1943, Serial No. 513,663

10 Claims. (Cl. 286—5)

This application relates to improvements in machinery packing and it particularly relates to oil or grease seals which may be readily assembled around the shaft to effectively seal the space between the shaft and the housing.

In automotive vehicles, greatest difficulty is had in preventing oil leakage around the crankshaft where it emerges from the housing. Since the crankshaft is usually enlarged where it contacts the flywheel, the seal cannot be applied in the ordinary way. To provide a seal applicable for this position, it has heretofore been proposed to make a separate, one-piece, annular flexible sealing element suitably cut so that it may be readily disposed around the shaft and to maintain the element in position with separable backing plates to maintain the sealing element in position. Such seals having separate sealing elements and backing plates have not, however, been nearly as satisfactory as unitary seals having the sealing element integrally bonded to a rigid backing member.

Unit seals heretofore proposed for sealing applications such as that described above have been in two semi-circular parts, as illustrated by U. S. Patent 2,335,561. While such seals are effective in reducing oil flow, they ofttimes develop leakage at the joints between the portions of the sealing element carried by the rigid backing sections of the seal. This is especially true in such joints which are disposed a substantial distance below the top of the shaft.

It is an object of the present invention to provide an engine seal which may be assembled around a shaft with an enlarged end to obtain a leakproof seal between the housing and the shaft.

It is another object of the present invention to provide an oil or grease seal which has a one-piece sealing element of resilient material bonded to suitable metal backing members and which still may be assembled about a crankshaft of an engine to produce a leakproof seal between the housing and the shaft.

It is a further object of the present invention to provide an oil or grease seal which contains no metal springs, which may be readily assembled about a shaft to produce a leakproof seal and which has a sealing element integrally bonded to resilient rubber backing.

Other objects will be apparent from the following detailed description of the invention illustrated by the accompanying drawing, in which.

Figure 1:
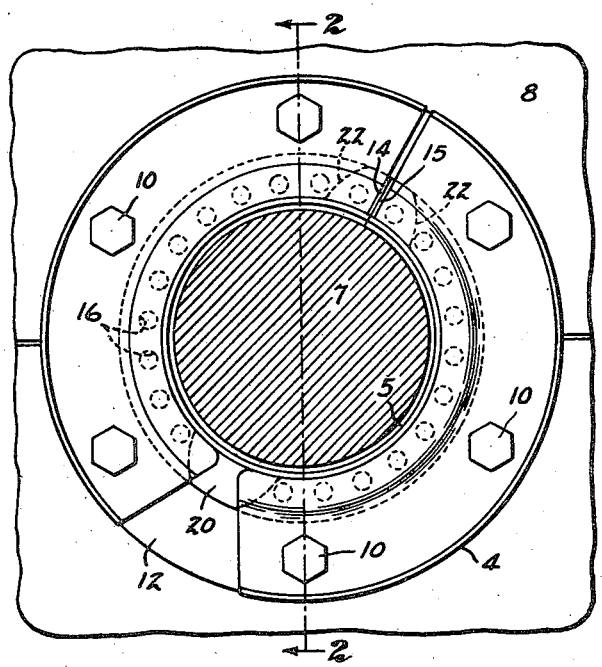
Figure 1 is an elevational view, partly in section, of a portion of an engine showing the seal embodying the present invention rigidly attached to the housing and positioned about a shaft protruding therefrom.
Figure 2:
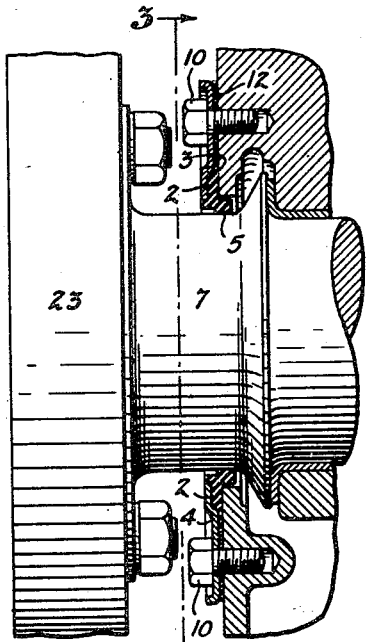
Fig. 2 is a sectional view through the seal and housing on the line 2—2 of Fig. 1, showing the sealing element in contact with the shaft.
Figure 3:
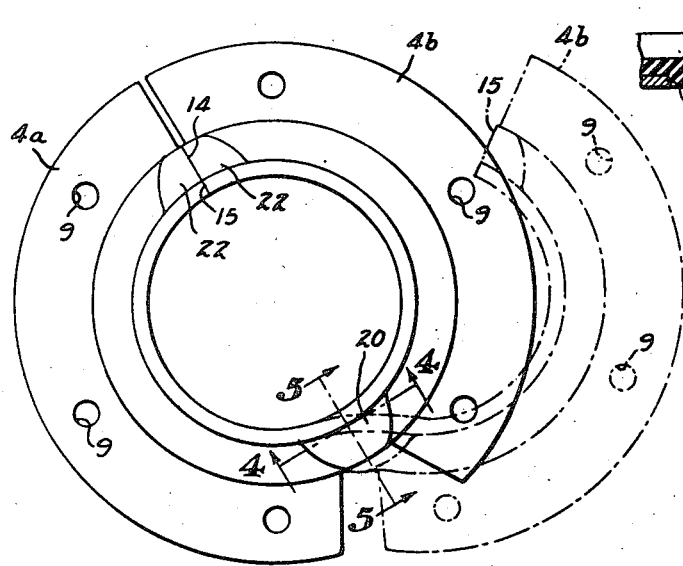
Fig. 3 is an elevational view of a seal embodying the present invention, the broken lines illustrating the seal in the distorted C-shaped position for assembly over the shaft.
Figure 4:
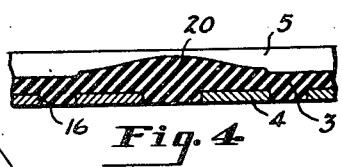
Fig. 4 is a sectional view on the line 4—4 of Fig. 1.
Figure 5:
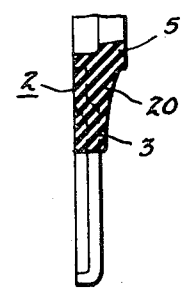
Fig. 5 is a sectional view on the line 5—5 of Fig. 1.

Referring more particularly to the drawings, in which like parts are designated by like numerals of reference throughout the several views, my improved seals have a one-piece, annularly molded sealing element 2 of suitable oil or grease-resistant rubberlike material, such as an oil-resistant copolymer of butadiene and acrylonitrile, polychloroprene, a suitable olefin-polysulfide condensation product, etc. The sealing element 2 has a body portion 3 adapted to be integrally molded against and preferably adhesively bonded to a rigid backing member 4 having a plurality of generally arcuately shaped sections 4a and 4b. The two sections hinge on a portion of the sealing element so that they may be opened up to encircle the shaft. The sealing element 2 has a lip portion 5 which terminates in a sealing edge 6 that is adapted to bear against the shaft 7, which may carry a suitable flywheel 23. A portion of the sealing element 2 between successive sections of the backing 4 is provided with a single transverse slit to provide ends 14 and 15 and permit separation thereof and to permit movement of one end of a section 4a of the backing member with respect to an end of a successive section 4b. Another end of each of the sections 4a and 4b of the backing member 4 is hinged on the sealing element 2.

The rigid backing member 4 is adapted to bear against the housing 8 and may be provided with suitably spaced openings 9. The openings 9 cooperate with the bolts 10 which serve as means for holding the seal stationary with respect to the housing and with the body portion 3 strongly against the housing so as to prevent leakage of fluid between the body 3 of the sealing member and the housing 8. In order to increase the rigidity of the backing portion and to provide increased sealing pressure on the gasket 12, the backing member 4 may be dished adjacent its outer periphery.

The sealing element 2, which is a split, centrally apertured, one-piece, molded packing ring of oil-resistant, resilient rubberlike material, is preferably molded in continuous annular form and thereafter cut or provided with only a single slit to permit separation of ends 14 and 15. The sealing element is preferably molded in contact with the inner arcuate peripheral portions of the sections 4a and 4b.

To assist in forming a strong bond between the backing member and the sealing element, the sections of the backing member are preferably provided with means such as a plurality of spaced openings 16. The openings 16 are filled with rubber during the molding operation and serve as means for increasing the contact area between the resilient material and the sections of the backing member.

The backing member 4 should preferably support the body portion 3 of the sealing element 2 over substantially the entire periphery of the latter. The ends of the sections of the backing member which terminate closely adjacent the cut surfaces 14 and 15 are, therefore, preferably radial. The opposite hinged ends of at least one and preferably both of the sections 4a and 4b, which ends lie adjacent the thickened hinged portion 20 of the sealing member 2, are preferably cut at an angle to the radial to provide an outer peripheral space for a hinging movement so that the sections and the attached sealing element may be opened up to a C-shape to be readily slipped over the shaft.

In order to decrease the possibility of rupture of the lip of the rubberlike sealing element 2 when the seals of the present invention are disposed about a shaft, the ends of the sections 4a and 4b adjacent the thickened hinge portion 20 are preferably spaced apart about ⅛ to ¼ inch or so. The additional support obtained by the thickened area 20, which preferably has a substantially spherical or rounded shape, of the body portion is sufficient to compensate for the loss of a small area of the backing portion.

A similar thickened area 22 is also preferably provided on the body portion 3 at the end portions, i. e. adjacent the edges 14 and 15 of the sealing element. Such thickened portions facilitate the attainment of increased sealing pressure between the free ends when the seal is disposed about the shaft.

I have found that it is important that the edges 14 and 15 be disposed above the horizontal axis of the shaft so that the lubricating fluid tends to drain away from the cut surfaces. Preferably the cut edges 14 are disposed at the top of the shaft, but it is found that when the cut edges 14 and 15 are disposed within an angle of about 45 degrees on either side of the vertical, substantially equivalent results are obtained and oil leakage is prevented and superior operation results.

It will be seen, since the sealing element 2 is molded in the form of a continuous annulus, the edges 14 and 15 preferably being produced by a simple cutting operation, that superior union of the edges 14 and 15 is had after the elements are disposed about the shaft. To further facilitate this union and to form the sealing element into substantially a continuous annulus, a coating of a suitable cement of rubberlike material is preferably applied to the edges 14 and 15.

Although several embodiments of the invention have been herein shown and described, it will be understood that numerous modifications of the construction shown may be resorted to without departing from the spirit of this invention as defined in the appended claims.

What I claim is:

1. An oil retaining device for sealing the space between a housing and a rotatable shaft comprising a backing member to be maintained stationary with respect to said housing and having two sections; a one-piece, centrally apertured molded sealing element of a rubberlike material having a body portion permanently attached to said sections of said backing member by surface adhesion and a sealing portion with a lip adapted to bear against said shaft; said sealing element having one transverse slit between the adjacent sections of said backing member to permit relative movement between portions of said sections, one end of each section of said backing member being spaced from the end of another section nearest thereto more than the other end to permit hinged opening of said annulus to C-shape by distortion of only a relatively small portion of said body portion of said sealing element while preventing concentration of stress at adhered surfaces sufficient to cause relative surface movement between any part of said sealing element and said backing portion.

2. A sealing device for sealing the space between a housing and a rotating shaft comprising a split, centrally apertured, one-piece molded sealing element of oil-resistant, rubberlike material, a rigid backing portion permanently bonded by surface adhesion to said sealing element, said backing portion being adapted to be secured to said housing and having a plurality of generally arcuate sections, one end of each of two successive sections being cut at an angle to the radial and being spaced to provide space for hinging of said sections on a portion of said sealing element without relative surface movement between said backing portion and said sealing element, said sealing element having a sealing portion with a lip to bear against said shaft and having a body portion attached to said backing portion.

3. The seal of claim 2 in which the body portion of the sealing element is thickened in the region between successive sections.

4. The seal of claim 2 in which the body portion of the sealing element is thickened adjacent both of the ends of each of the sections of the backing portion to provide support for the sealing portion thereof between said sections.

5. A sealing device for sealing the space between a housing and a shaft adapted to rotate in said housing, comprising a split, centrally apertured, one-piece molded sealing element of oil-resistant, rubberlike material, a rigid backing portion permanently bonded by surface adhesion to said sealing element, said backing portion being adapted to be secured to said housing and having two sections, each having a portion of substantial semi-circular extent for contact with said sealing element, one end of each section being cut substantially radial and the other end of each section being spaced from other sections and cut at an angle to the radial to provide space for hinging of said sections on a portion of said sealing element, said sealing element having a sealing portion to bear against said shaft and having a body portion attached by surface adhesion to said backing portion, said body portion adjacent said sealing portion in the space for hinging between sections being thickened to compensate for local absence of said backing portion, said sections being hingeable on said thickened portion on said sealing element to permit opening of said sealing device to substantially C-shape without surface slippage between said sealing element and said backing portion.

6. A sealing device for sealing the space between a housing and a rotatable shaft comprising a split, centrally apertured, one-piece molded sealing element of oil-resistant, rubberlike material, a rigid metallic backing portion permanently bonded by rubber-to-metal adhesion to said sealing element, said backing portion being adapted to be secured to said housing and having two separate rigid sections, each of substantially semi-circular extent, an end of at least one of said sections being spaced from the end of the other section nearest thereto to provide space for hinging of said sections on a portion of said sealing element, said sealing element having a sealing portion with a lip to bear against said shaft and, having a body portion attached to said backing portion, said rigid sections being hingeable on that portion of said sealing element in the space between sections to permit opening of said sections to envelop a shaft without causing surface slippage between said sealing element and any part of said rigid backing portion.

7. In combination with a housing and a shaft adapted to rotate in said housing, a centrally apertured, one-piece molded sealing element of oil-resistant, rubberlike material having a transverse slit therein to provide separable ends; a metallic backing portion permanently bonded by rubber-to-metal adhesion to said sealing element, said backing portion having a plurality of rigid sections, one end of each of two successive sections being spaced apart and cut at an angle to the radial to provide space for hinging of said sections on a portion of said sealing element, and means for attaching said backing portion to said housing, the separable ends of said sealing element being disposed substantially above the horizontal center line of said shaft, said rigid sections being hingeable on that portion of said sealing element in the space between sections to permit opening of said sections to envelop a shaft without causing surface slippage between said sealing element and any part of said rigid backing portion.

8. The seal of claim 1 wherein the body portion of said sealing element between the hinged ends of said sections is thickened so as to provide reinforcement for said sealing lip between said sections.

9. The combination of claim 7 wherein the shaft is horizontal and the slit through said sealing element is disposed within an angle of 45 degrees on either side of the intersection of the vertical axial plane through the shaft and the upper surface of the shaft.

10. The oil-retaining device of claim 6 further characterized in that the rigid metallic backing portion has a plurality of spaced openings therein, which openings are filled with the rubberlike body material of said sealing element, the latter being bonded to the walls of said openings, whereby the contact area between said body portion of said sealing element and said backing portion is increased.

THOMAS H. WINKELJOHN.

REFERENCES CITED

The following references are of record in the file of this patent:

UNITED STATES PATENTS

| Number | Name | Date |
|---|---|---|
| 1,662,707 | Hosmer | Mar. 13, 1928 |
| 1,872,182 | Pohl | Aug. 16, 1932 |
| 2,209,578 | Rainey et al. | July 30, 1940 |
| 2,335,561 | Dodge | Nov. 30, 1943 |
| 2,348,587 | Antonelli | May 9, 1944 |